Aug. 10, 1948.                    C. CITO                    2,446,809
                AUTOMATIC TONGS FOR MANUAL ELECTRIC
                        ARC WELDING OR CUTTING
Filed May 28, 1945                                    3 Sheets-Sheet 1
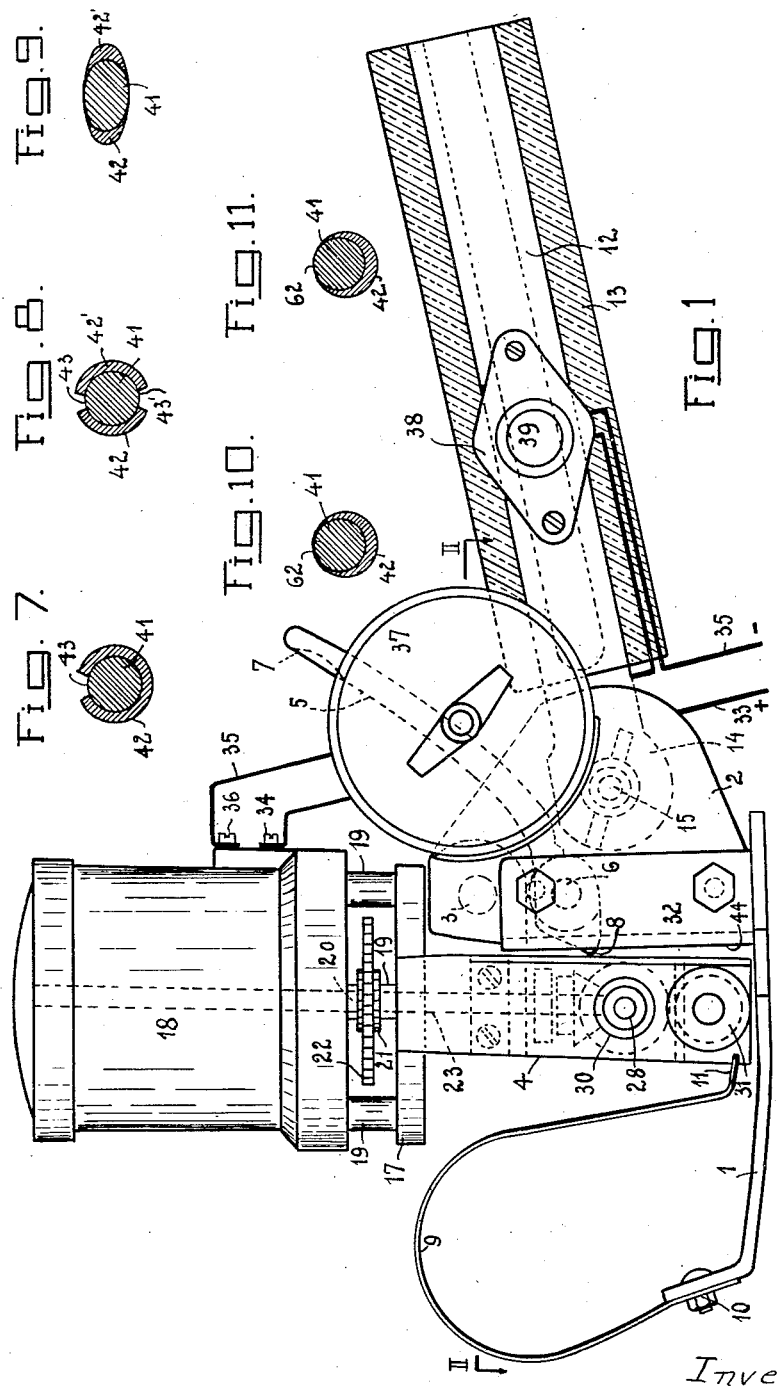
Inventor,
Camillo Cito
By
Young, Emery & Thompson
           Attys.

Aug. 10, 1948. C. CITO 2,446,809
AUTOMATIC TONGS FOR MANUAL ELECTRIC
ARC WELDING OR CUTTING
Filed May 28, 1945 3 Sheets-Sheet 2
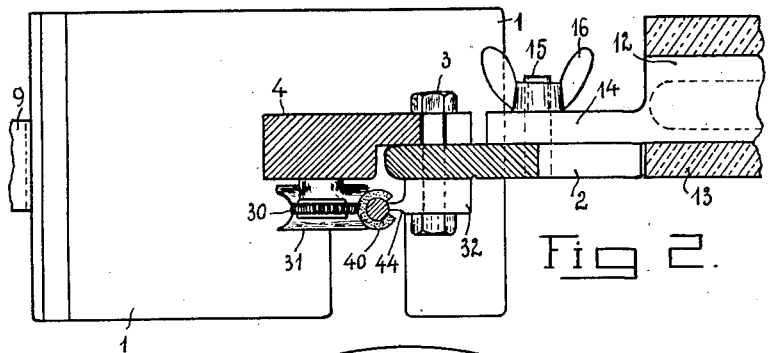
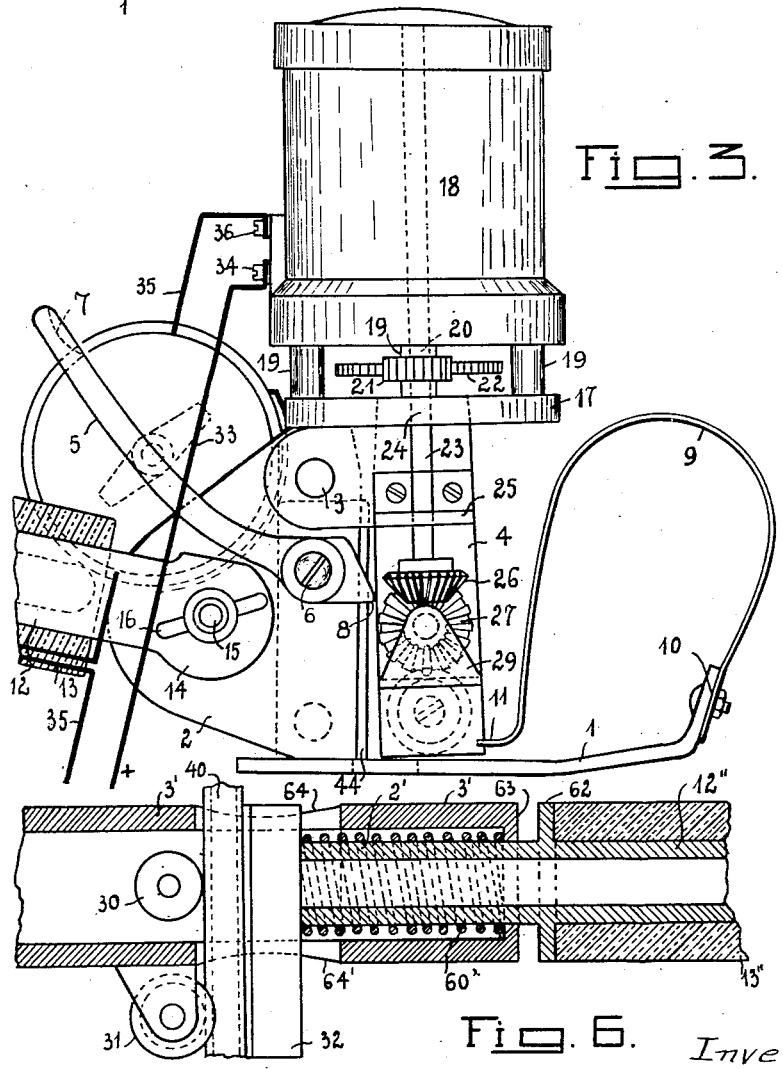
Inventor,
Camillo Cito
By
Young, Emery & Thompson
Attys.

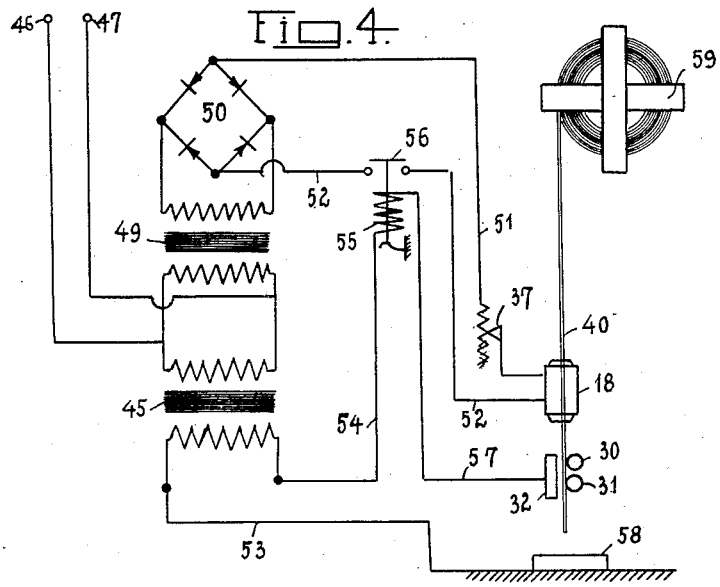
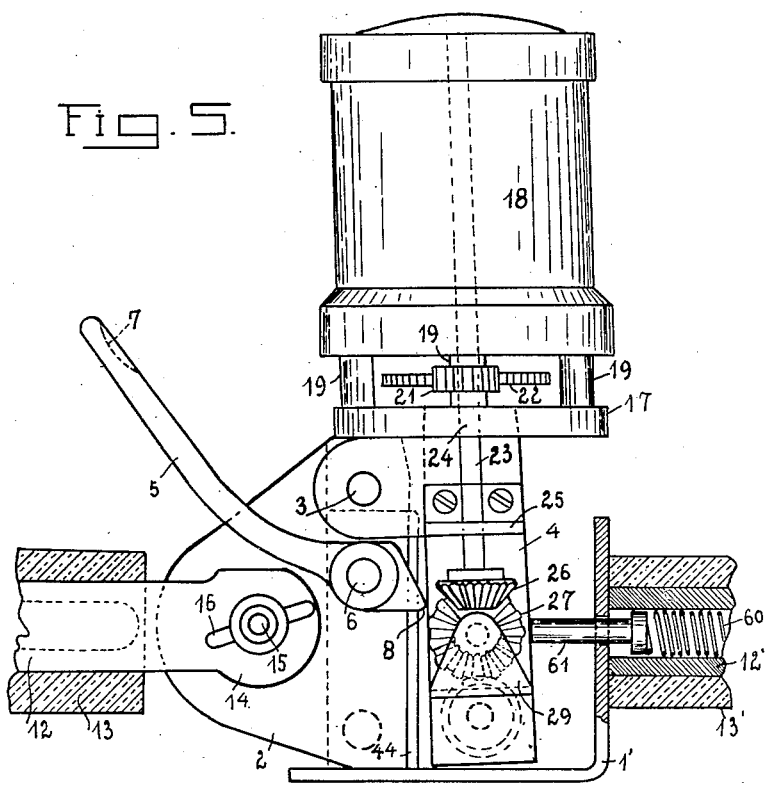

Patented Aug. 10, 1948

2,446,809

UNITED STATES PATENT OFFICE 2,446,809

AUTOMATIC TONGS FOR MANUAL ELECTRIC ARC WELDING OR CUTTING

Camillo Cito, Uccle-Brussels, Belgium, assignor to La Soudure Electrique Autogene, Societe Anonyme, Brussels, Belgium Application May 28, 1945, Serial No. 596,322
In France June 5, 1944

6 Claims. (Cl. 219—8)

The present invention relates to a pair of tongs for manual electric arc welding or cutting, with automatic advancement of the welding or cutting electrode.

The chief purpose of the invention is to provide tongs permitting a quicker manual welding not only by the increase of the welding speed, but also by the diminution or suppression of the number of restartings of the work, by making use of electrodes which are longer than the usual length or of an electrode of undetermined length unrolled from a roller.

The invention consists in a structure in which the said welding or cutting electrode can advance automatically in the jaws of tongs between which it is clamped and electrically connected by contact. This advancement, during which at least one of the jaws of the tongs ensures the electric contact of the electrode can take place under the influence of a mechanical, pneumatic or, preferably, electric motor, through the medium of suitable means and in such a way that the welding rod or electrode stops automatically before its end leaves the tongs. Moreover, the advancing speed of the electrode can be regulated in connection with the length of the arc with the aid of a member mounted on the handle of the tongs.

In order to permit a greater density of the welding current, the electric contact takes place at a short distance from the electric arc through the medium of a comparatively long friction member, which at the same time avoids the formation of pearls.

The automatic tongs according to the invention can be used with bare or core electrodes or with covered or coated electrodes of a special form, the advantages and particularities of which will be shown in the following description of certain embodiments of the object of the invention.

In the accompanying drawings:

Figure 1 is a side view partly in section of tongs according to the invention wherein the advancement of the electrode is controlled by an electric motor, the supply circuit of which comprises a switch mounted in the handle of the tongs.

Figure 2 is a top view of the jaws of the tongs after section, along the line II—II of Figure 1.

Figure 3 is a view similar to Fig. 1, seen from the other side, and shows more specially mechanical members for advancing, for guiding and for effecting contact with the electrode.

Figure 4 is a schematic view of a circuit for feeding the electric driving motor of the electrode in tongs mechanically analogous to those of the preceding figures.

Figure 5 is a view similar to Figure 3, another embodiment of the tongs according to the invention, but having two handles.

Figure 6 is a fragmentary side view partly in section of tongs according to the invention provided with non-pivoted jaws.

Figure 7 to Figure 11 show, in cross section, forms of special coated electrodes which can be used advantageously with the tongs according to the invention.

In these different figures, like reference characters indicate identical elements.

The tongs represented in Figures 1 to 3 comprise a shield 1 forming a spark-quencher. On this shield, is rigidly mounted the fixed jaw or branch 2 of the tongs, on which is pivoted, at 3, the mobile jaw or branch 4.

The mobile branch 4 can be moved relative to the fixed branch 2 by a crank-lever 5, pivoted at 6, provided at one end with a key or finger 7 and at the other end with a beak 8 acting on the interior face of the mobile branch 4 against the action of a bent spring leaf 9. The ends of the latter are fixed, on the one hand, at 10, at one of the ends of the spark-quencher 1 and, on the other hand, at 11, at the end of the mobile branch 4 of the tongs near which the electrode comes out of the tongs, as will be described later on.

The jaw 2, which forms the fixed branch of the tongs, is lengthened by a tubular handle 12, which serves, in a well-known manner, for the passage of the cable that supplies the welding current and is surrounded with an insulating sheath 13 which serves as a handle.

In order to be able to shift and regulate the angle of the handle of the tongs in regard to the work, this handle ends in an arm 14, which can pivot at 15 around the pin of a bolt on which is engaged a winged nut 16 which serves to clamp the fixed branch 2 against the said arm 14.

At the end of the mobile branch 4, opposite to that through which the electrode comes out of the tongs, is a plate 17 on which is mounted a small electric motor 18 through the medium of spacers 19. This plate and the motor housing, as well as all the members which have just been described, with the exception of the spring 9 and the pivoting members at 3, 6 and 15, can be made of light metal in order to reduce the weight of the tongs to a minimum.

The shaft 20 of the motor 18 bears a pinion 21 (Figure 3) which drives a toothed wheel 22 fixed on a shaft 23. This latter traverses a bearing 24 in the plate 17 and a bearing 25 mounted on the mobile branch 4. The shaft 23 also carries a conical pinion 26 which drives a conical wheel 27, the shaft 28 of which (Figure 1) is supported, on the one hand, in the mobile branch 4 and, on the other hand, in a bracket 29 (Figure 3) fixed on the latter. The shaft 28 is firmly connected with a small-toothed wheel 30 (Figures 1 and 2) intended to drive the electrode. Between this small-toothed wheel 30 and the end of branch 4 through which the electrode comes out of the tongs, there is an idle grooved wheel 31, the function of which will be explained in a later part of this description.

On the other hand, in face of the small-toothed wheel 30 and of the grooved wheel 31 of the mobile branch 4, there is mounted, on the fixed branch 2, a contact lamination or contact finger 32 of bronze to take the current of the electrode. This contact finger is comparatively long.

To have a suitable starting torque, the motor 18 is, preferably, a direct current and low tension motor. The source of the current of this motor can be independent or may be, for instance, branched off from the direct welding current through the medium of a suitable resistance. It can also be branched off from the alternating welding current through the medium of a current rectifier.

In Figures 1 and 3, the connections of the motor 18 with the source of current are schematically shown and constituted by flexible conductors, one of which, 33, connects directly to the source of current with one of the terminals 34 of the motor, whereas the other conductor 35 connects the terminal 36 with the source of current by passing through a variable resistance 37, the housing of which is firmly connected with the fixed branch 2, and through a switch 38 mounted on the handle of the tongs in such a way that the contact stud 39 of this switch can be pushed upon by the thumb of the right hand of the welder.

The free ends of the conductors 33 and 35, schematically shown in the drawing, can also be practically fitted into the handle of the tongs with the cable which supplies the welding current, which is not indicated to make the figure more clear.

The tongs shown in Figures 1 and 3 are opened by an action which is effected by the key 7 of the lever 5 by pushing thereon with the thumb of the right hand, the fingers pressing the handle 12—13 of the tongs.

To make the drawings more clear, only in the Figure 2, has an electrode 40 been indicated as being fitted into the tongs. This electrode 40, represented on the other hand on a larger scale and in cross section in Figure 7, comprises a metallic core 41 and a coating 42. It may have any length or be undetermined and, for instance, be rolled up on a drum, which is not indicated in the figures described up to now.

The coating 42 has a groove or slot 43 following a generatrix which extends throughout the whole length of the electrode.

The described device operates as follows:

The free end of the electrode is introduced into the tongs which have been opened by pushing upon the key 7 of the lever 5 in such a way that the edge 44 of the contact finger 32 is introduced into the groove 43 and comes on the whole length into contact with the metallic core 41 of the electrode. Upon release of the key 7, the beak 8 of this lever ceases to operate against the jaw 4 which, by closing itself under the influence of the spring 9, presses the electrode against the small-toothed wheel 30 and against the groove of the idle wheel 31. The rotation speed of the motor 18 having been set beforehand by means of the variable resistance 37, the motor is started by simply pressing with the thumb on the button 39 of the switch 38, which is mounted on the handle 12—13 of the tongs. In consequence of the putting of the mechanism 21, 22, 23, 26, 27, 28, 30 into rotation, the small-toothed wheel 30, in contact with the coating of the electrode 40, shifts this latter regularly along the contact finger 32, which is introduced into the groove of the coating and serves as a rail for the electrode, whereas the idle grooved wheel 31 serves as guide.

The advancement of the electrode can be kept almost constant by the welder himself who can correct the small differences of the advancement speed due to the regulation which he effects with the aid of the variable resistance 37 in relation with the length of arc which he wants to obtain.

In order to avoid the production of an untimely arc when the end of the electrode approaches the exit of the tongs, the loose grooved wheel 31 further has the task of maintaining the final end of the electrode and of keeping it back in the tongs as soon as it slips away from the influence of the small-toothed driving wheel 30. In this way, it prevents the end of the electrode from falling on the work.

It is likewise to be noted that the mobile branch 4 bears the motor and the mechanisms for advancement and for retention of the electrode in such a way that the weight of these members is compensated by that of the members of contact, of regulation, of driving and of supply of current supported by the other branch which is firmly connected with the holder of the tongs.

In another embodiment of the tongs according to the invention, there is provided an automatic remote control of the starting of the motor which drives the advancement of the electrode. In this embodiment, the starting and stopping of the motor 18 depend, respectively but solely, on the closing and the rupture of the current of the welding arc.

An embodiment of this kind is represented in Figure 4, where an alternating current welding apparatus is shown which comprises, besides a welding transformer 45 connected with terminals 46 and 47 of a supply circuit, an auxiliary transformer 49 which feeds a rectifier 50. The external circuit of the latter is formed by conductors 51 and 52 connected with the motor 18 of the tongs. These tongs also carry the variable resistance 37 in the supply circuit of the motor 18.

One of the terminals of the secondary of the welding transformer 45 is connected with the ground, in a well-known manner, by a conductor 53. The other terminal of the secondary of the welding transformer is connected, by a conductor 54, with the actuative winding 55 of a relay 56 in the supply circuit of motor 18. The winding 55 is connected, on the other hand, by a conductor 57, with the contact finger 32 which effects in the jaws of the tongs the electric contact with the grooved electrode 40, the guiding and advancement of which are ensured, as described above, respectively by the idle grooved wheel 31 and by the small-toothed wheel 30 actuated by the motor 18.

In this embodiment, the striking of the arc on the work represented at 58, provokes the closing of relay 56, due to the closing of the arc circuit 53, 54, 55, 57, 32, 40, 58 and the motor 18 of the tongs starts, making the electrode advance towards the work, in proportion to its melting. The electrode of undefined length can come from a drum 59 on which it is rolled up. It goes without saying that the conductors 51 and 52 of motor 18 and the conductor 57 of the welding circuit, can be grouped in the same cable to be fitted into the handle of the tongs.

In another embodiment, represented in Figure 5; the tongs according to the invention present two handles 12—13 and 12'—13', in extending opposite directions. In this case, the spring which operates on the mobile branch 4 in order to ensure the closing and clamping of the jaws, is a helicoidal spring 60 fitted into the second handle 12'—13'. This spring acts, for instance, through the medium of a punch 61 engaged before it into the handle 12'—13' fixed on the spark-quencher 1', whereas the other handle 12, 13 can contain the cable or cables for the supply and distribution of the current. This embodiment permits not only to make use of the two hands for the manipulation of the tongs, but also to deposit at the desired place slag originating from the fusion of the coating, either chiefly before or chiefly behind the metal which is being deposited, according as the groove 43 (Figure 7) in the coating is provided for behind or before the core of the electrode with regard to the direction of advancement of the welding.

The invention is not solely applicable to tongs with jaws pivoted. Figure 6 shows, by way of example, a pair of tongs wherein the jaws 2' and 3' are formed by two tubular pieces which can slide one in the other. The jaw 2' of the tongs is the prolongation of a tube 12'' which forms the handle of the tongs, wherein the cables which supply the current can pass. This tube 12'' is surrounded by an insulating sheath 13'' serving as handle and has a circular stop 62 which blocks the handle 12'' against the transverse wall 63 of the tubular piece 3' when the jaws of the tongs close themselves under the influence of a spring 60', pressed in the interior of piece 3', between the said tranverse wall 63 and the contact finger 32 firmly connected with the tubular piece 2'. The tubular piece 3' has two openings 64—64', diametrically opposed, through which passes the electrode 40 in order to be pressed by the contact finger 32 against the small-toothed wheel 30 and into the groove of the loose wheel 31.

Here too, the small-toothed wheel 30 is driven by a motor not indicated, such as the motor 18 of the foregoing figures, and through the medium of a mechanism equivalent to that which was heretofore designated by 21, 22, 23, 26, 27, 28.

In the more or less diagrammatically shown tongs, which have just been described, the handle of the tongs lengthens the mobile jaw 2' with regard to the fixed jaw 3' supporting the mechanisms. Inversely, and as a matter of course, the handle of the tongs might lengthen the fixed branch 3' supporting the mechanisms or, as already described, the tongs might have two handles.

In the tongs according to the invention, coated electrodes can be used, the embodiment of which differs from that shown in Figure 7.

Figure 8 shows the cross section of a form of coated electrode, doubly grooved at 43 and 43', at the ends of a diameter, along two generatrices of the cylinder formed by the metallic core 41. In this case, the tongs according to the invention can have two contact fingers, diametrically opposed, by means of which the electrode receives its electric contact as well as a mechanism for guiding and advancement analogous or equivalent to that already described, but the idle wheel and the small-toothed driving wheel of which are at the ends of another diameter, forming, for instance, an angle of 90° with regard to the diameter at the ends of which are the two edges of the opposite contact fingers.

In this connection, the form of coated electrode, shown by Figure 9, can also be made use of, in which form the metallic core 41 presents an oval or elliptic section, the exterior coating 42, 42' laterally enveloping the two opposite faces of the ellipse situated on both sides of the small diameter of this latter.

As Figures 10 and 11 show, it is also possible to make use of electrodes with eccentric coating, baring at 62 a generatrix of the cylinder formed by the metallic core of the electrode. In Figure 10, this bared generatrix passes through the point where the circle corresponding to the cross section of the metallic core 41 is tangent to the circle corresponding to the cross section of the coating 42.

In Figure 11, this bared generatrix forms part of a bared surface through the fact that the circle which limits the right section of the core 41 comes out of the circle which limits the coating 42.

In this latter case, exactly like in that of a bare electrode, the edge or friction surface of the contact finger 32 of the fixed jaw 2 of the tongs, can present a slightly concave section into which enters the bared convex part of the electrode with eccentric coating.

In all the cases of coated electrodes with a bared part, it has been observed that the groove or the eccentricity of the coating with regard to the core no longer shows the classical drawbacks well-known, whenever this groove or this eccentricity is suitably oriented with regard to the direction of advancement of the electrode. The regulation of the angle which the handle forms with regard to the spark-quencher of the device and/or the disposal of two opposite handles facilitate this orientation.

Among the objects realized by the tongs according to the present invention and besides the advantages which have appeared in the above description, it should be noted that the disposal, near the work, of the friction member for taking the current on the core of the electrode permits, owing to the diminution of the ohmic resistance, a considerable increase of the intensity of the applied current, while suppressing the drawback resulting from the Joule effect which, whenever the length of the electrode between the jaws and the arc becomes small, generally makes the welding metal red-hot.

This faculty of increasing the intensity of the current while avoiding this latter drawback, permits, moreover, to add a supplementary warmth, independently from the exothermy which can result from the combustion or from the reaction of the coating materials.

What I claim is:

1. Automatic tongs for manual electric arc welding or cutting, comprising two jaws, a handle on which one of these jaws is firmly mounted, means for acting on the other jaw for clamping an electrode between the two jaws, means for leading current to at least one comparatively long friction member in contact with the clamped electrode until near the exit of the tongs, mechanical means for advancing the clamped electrode, means positioned between the exit of the tongs and the mechanical advancing means for maintaining the end of the electrode in the tongs in order to prevent the untimely fall of the end of the electrode on the work when it leaves said mechanical advancing means, means mounted on the handle of the tongs for regulating the advancement speed of the electrode in connection with the arc length, a control for the regulating means, the mechanical advancing means of the electrode and the maintaining means of the electrode preventing the latter from falling untimely being mounted on the mobile jaw while said friction member, regulating means, control and leading means of the electric current to the friction member are borne by the fixed jaw mounted on the handle of the tongs.

2. Automatic tongs for manual electric arc welding or cutting, comprising a pair of jaws, means acting on at least one of said jaws for clamping an electrode between the latter, means for leading electric current to a friction member in contact with the conducting surface of the clamped electrode until near the exit of the tongs, an electric motor, a small-toothed wheel engaging on the side the surface of the electrode opposite to that where said friction member is in contact with the electrode, means for rotating said small-toothed wheel by said motor, and a grooved loose wheel so disposed that the electrode passes into it after it has left said small-toothed wheel.

3. Automatic tongs for manual electric arc welding or cutting, comprising a pair of jaws, a handle on which one of these jaws is firmly mounted, a spring pressing the other jaw against it, a lever pivoting relatively to the latter and adapted to act against the influence of said spring in order to remove the two jaws from the other when the operator acts on this lever, means for leading electric current to one of said jaws, and a device for the automatic advancement towards the work of an electrode clamped between said jaws.

4. Automatic tongs for manual electric arc welding or cutting, comprising a pair of jaws, two opposite handles firmly connected to one jaw, a spring acting on the other jaw in such a manner as to ensure the closing of the jaws and the clamping of an electrode placed between them, means for leading electric current to the clamped electrode, and a device for the automatic advancement of the clamped electrode towards the work.

5. Automatic tongs for manual electric arc welding or cutting, comprising a friction member forming one of the jaws of a pair of jaws, a handle firmly connected to said friction member, a spring acting on the other jaw in such a manner as to ensure the closing of the two jaws and the clamping of an electrode placed between the latter, means for leading electric current to said friction member, an electric motor, a small-toothed wheel engaging on the side the surface of the electrode opposite to that where said friction member is in contact with the electrode, means for rotating said small-toothed wheel by said motor, and a grooved loose wheel so disposed that the electrode passes between it and said friction member after it has left said small-toothed wheel.

6. Automatic tongs for manual electric arc welding or cutting, comprising a pair of jaws, means acting on at least one of said jaws for clamping an electrode between the latter, means for leading electric current to a friction member in contact with the conducting surface of the clamped electrode until near the exit of the tongs, an electric motor mounted on the jaw other than said friction member, a small-toothed wheel on said jaw engaging on the side of the surface of the electrode opposite to that where said friction member is in contact with the electrode, means for rotating said small-toothed wheel by said motor, and a grooved loose wheel so disposed that the electrode passes into it after it has left said small-toothed wheel.

CAMILLO CITO.

REFERENCES CITED

The following references are of record in the file of this patent:

UNITED STATES PATENTS

| Number | Name | Date |
|---|---|---|
| 1,643,254 | Miller | Sept. 20, 1927 |
| 1,731,502 | Paterson | Oct. 15, 1929 |
| 1,738,573 | Goodspeed | Dec. 10, 1929 |
| 1,853,609 | Goodspeed | Apr. 12, 1932 |
| 1,989,546 | Chapman | Jan. 29, 1935 |
| 2,069,623 | Pickhaver et al. | Feb. 2, 1937 |
| 2,102,813 | Southgate et al. | Dec. 21, 1937 |
| 2,145,010 | Kennedy et al. | Jan. 24, 1939 |
| 2,190,927 | Kennedy | Feb. 20, 1940 |
| 2,216,564 | Chapman | Oct. 1, 1940 |